United States Patent [19]
Bailey et al.

[11] Patent Number: 5,835,084
[45] Date of Patent: Nov. 10, 1998

[54] METHOD AND COMPUTERIZED APPARATUS FOR DISTINGUISHING BETWEEN READ AND UNREAD MESSAGES LISTED IN A GRAPHICAL MESSAGE WINDOW

[75] Inventors: Steven J. Bailey; Eric Berman, both of Redmond; Coyle Brett Marl; Luis Talavera, both of Seattle, all of Wash.

[73] Assignee: Microsoft Corporation, Redmond, Wash.

[21] Appl. No.: 640,563

[22] Filed: May 1, 1996

[51] Int. Cl.⁶ .................................................. G06F 3/14
[52] U.S. Cl. ............................................................ 345/326
[58] Field of Search ..................................... 395/326, 336, 395/338, 341, 347, 339, 340; 345/326, 336, 338, 341, 347, 339, 340, 329, 330, 331, 332

[56] References Cited

U.S. PATENT DOCUMENTS

| | | | |
|---|---|---|---|
| 5,283,856 | 2/1994 | Gross et al. .............................. | 706/47 |
| 5,307,086 | 4/1994 | Griffin et al. ............................ | 345/146 |
| 5,485,506 | 1/1996 | Recht et al. .............................. | 379/67 |
| 5,579,472 | 11/1996 | Keyworth, II et al. ................. | 345/326 |

OTHER PUBLICATIONS

"Microsoft Mail User's Guide", Microsoft Corporation, pp. 1–2,23, 1992.
News Release on Internet from Fonte Inc., "Agent.99d Now Available", published Feb. 6, 1996, from agent–support–newsletter@fonteinc.com, pp. 1–5.

*Primary Examiner*—Matthew M. Kim
*Assistant Examiner*—Crescelle N. dela Torre
*Attorney, Agent, or Firm*—Lee & Hayes, PLLC

[57] ABSTRACT

A computer-implemented messaging application (e.g., e-mail, browser, paging) lists messages addressed to a user in a graphical message window of a graphical user interface. The message window lists both read and unread messages. The read messages are displayed visually differently than the unread messages to distinguish between the two types. A highlight bar identifies a particular message in the list. The message window has a preview pane in which the highlighted message can be previewed by a user without opening that message into a separate window. Heuristics are employed to determine whether the user is likely to be reading the message while it is displayed in the preview pane. For instance, scrolling the message in the preview pane is evidence that the user is likely to be reading the message. If any heuristic condition is met, the message is marked as read.

13 Claims, 5 Drawing Sheets

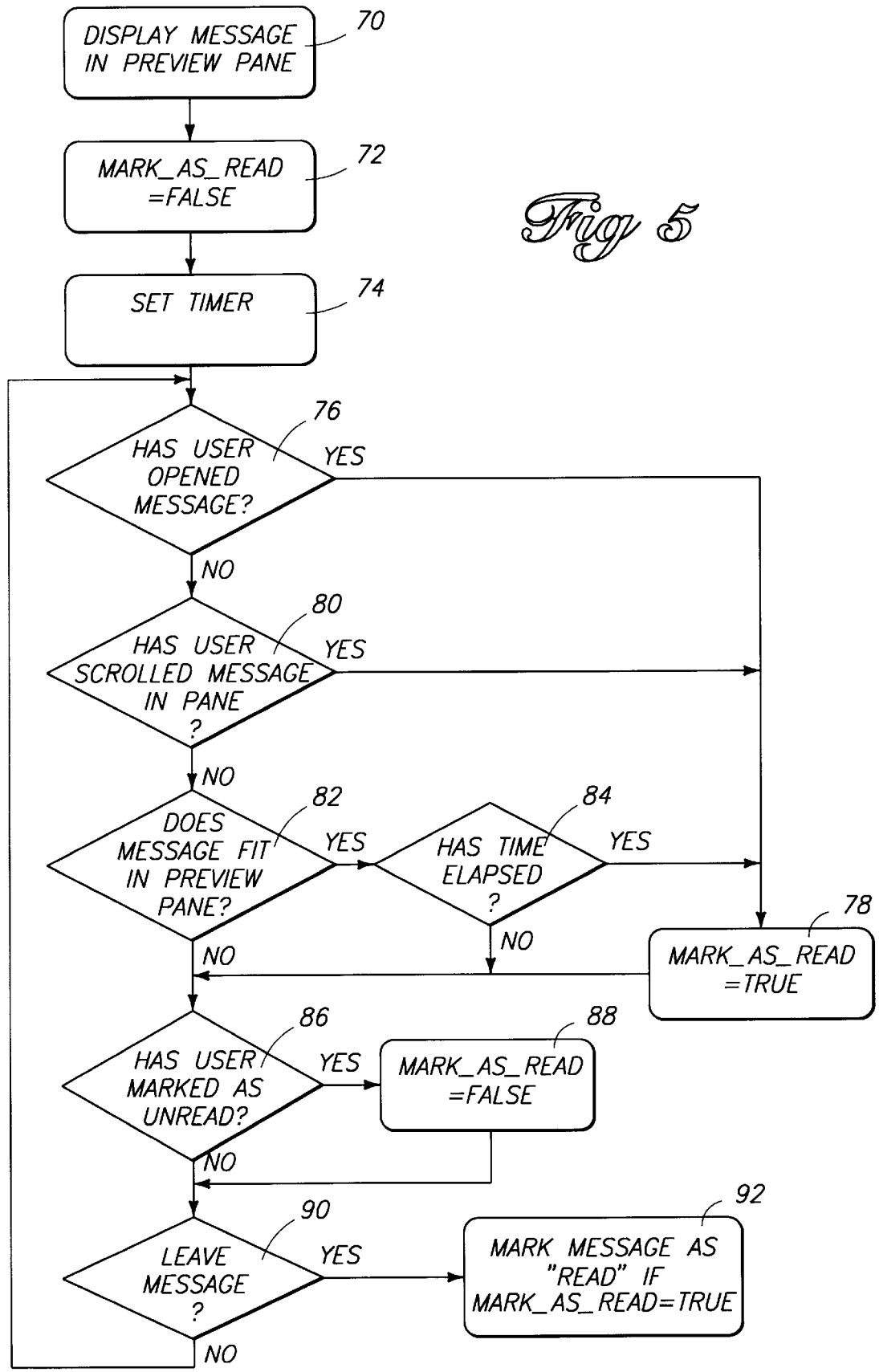

METHOD AND COMPUTERIZED APPARATUS FOR DISTINGUISHING BETWEEN READ AND UNREAD MESSAGES LISTED IN A GRAPHICAL MESSAGE WINDOW

TECHNICAL FIELD

This invention relates to computer-implemented messaging programs—such as electronic mail, bulletin board systems, and paging programs—which list messages addressed to a user. More particularly, this invention relates to methods for distinguishing messages to be read by the user from messages that have been read by the user.

BACKGROUND OF THE INVENTION

Messaging programs are familiar to computer users. Electronic mail ("e-mail") is one type of messaging program in which users exchange electronic messages over a data communications network, such as a LAN (local area network). Bulletin-board systems, such as those for reading USENET Newsgroups on the Internet, are another example of messaging programs. The messages or bulletin-board posts are created at one location, routed automatically over the network to the user's computer, and collected in a local memory that is accessible by the messaging program. The messages are stored until the user is ready to view them.

In a windows operating environment, the user initiates the messaging program by opening a graphical message window to review stored messages. The message window typically includes a list of message headers organized in chronological order according to the time they are received. The list often shows the sender's name, the subject of the message, and the time received. A highlight bar or other pointer is used to identify a selected message on the list. The user manipulates the highlight bar using a mouse or keyboard to scroll through the list of messages.

The list of messages will often include messages that have been read by the user, and messages which have not been read. There is a visual indication distinguishing between the read and unread messages. This visual indication might consist of boldface text, italics, highlight colors, or a flag next to the headers of unread messages. The read/unread indication is particularly useful because the user often wants to focus first on the new messages, especially in high-traffic newsgroups which may post hundreds of messages each day.

To read a message, the user selects the message with the highlight bar and opens a second window containing the content of the message. When the user finishes the message, the content-specific window is closed and the related message header in the message list is marked as being read. That is, the previous "unread" visual indication (boldface text, italics, etc.) is changed to a "read" visual indication (plain text, non-italics, etc.).

Recently, some messaging programs have added a preview pane to the graphical message window. The preview pane is a dedicated portion of the message window and typically adjoins a panel containing the list of messages. The preview pane shows the content of the message that is highlighted by the highlight bar in the message list. The preview pane is a convenient way for the user to quickly ascertain the gist of a message without having to open a separate window.

In many of these programs, the user must explicitly open the message before it is marked as read. As an example, a news reader program called "Internews" from Apple Corporation requires a user to activate the message (i.e., a double click with a mouse key, or a highlight and enter keyboard operation) before the message is marked as read. However, the user might very well have read the entire message, or enough of it, in the preview pane to be satisfied that he/she has read the message. Yet, even though the message has been read while in the preview pane, the messaging program still indicates that the message is unread because the user did not expressly activate the message. This defeats the purpose of the preview pane.

Another messaging product named "Agent" from Forte Corporation also includes a preview pane. However, the "Agent" program requires double clicking the message before it is even shown in the preview pane. Upon double clicking, the message is marked as read.

On the other hand, messaging programs should not be too quick to mark the message as read. In an Internet browser from Netscape Corporation, messages are marked as read immediately as soon as they are displayed in the preview pane. This mark-as-read rule can be problematic, however, if the user does not take time to read the message in the preview pane. For instance, suppose the user scrolls through a batch of unread messages to read a particular message at the bottom of the list. The Netscape browser will mark all unread messages listed above the selected unread message as being read, even though the user scrolled past them without reading their corresponding contents in the preview pane.

These mark-as-read rules in previous messaging programs do not accurately reflect whether the user has read or has not read the message. Accordingly, there is a need to develop a new method for distinguishing between read and unread messages.

SUMMARY OF THE INVENTION

This invention concerns an improved technique for distinguishing messages to be read by a user from messages that have been read by the user. A user launches a messaging application (e.g., e-mail, browser, paging) by activating a graphical message window in a graphical user interface environment. The message window lists the messages addressed to the user (both read and unread). The message window has a preview pane in which a message can be viewed by a user without opening that message into a separate message-specific window.

A highlight bar identifies a particular message in the list which is displayed in the preview pane. Heuristics are employed to determine whether the user is likely to be reading the message while it is displayed in the preview pane. For instance, one heuristic is whether the user scrolls the message in the preview pane. Scrolling is evidence that the user is likely to be reading the message. Another heuristic is whether the entire message is visible in the preview pane for a selected time period (e.g., 2–5 seconds). This behavior indicates that the user is likely to have read the message while depicted. If any heuristic condition is met, the message is marked as read.

In this manner, the preview pane becomes a quick tool to perusing messages without having to explicitly open the message into its own separate window. By using heuristics, the method more intelligently reflects the user's reading pattern, leaving those messages that are likely to be unread indicated as being unread while marking as read those messages that are likely to have been read.

BRIEF DESCRIPTION OF THE DRAWINGS

FIG. 5 is a flow diagram of steps in a method for distinguishing read messages from unread messages.

DETAILED DESCRIPTION OF THE PREFERRED EMBODIMENT

Figure 1:
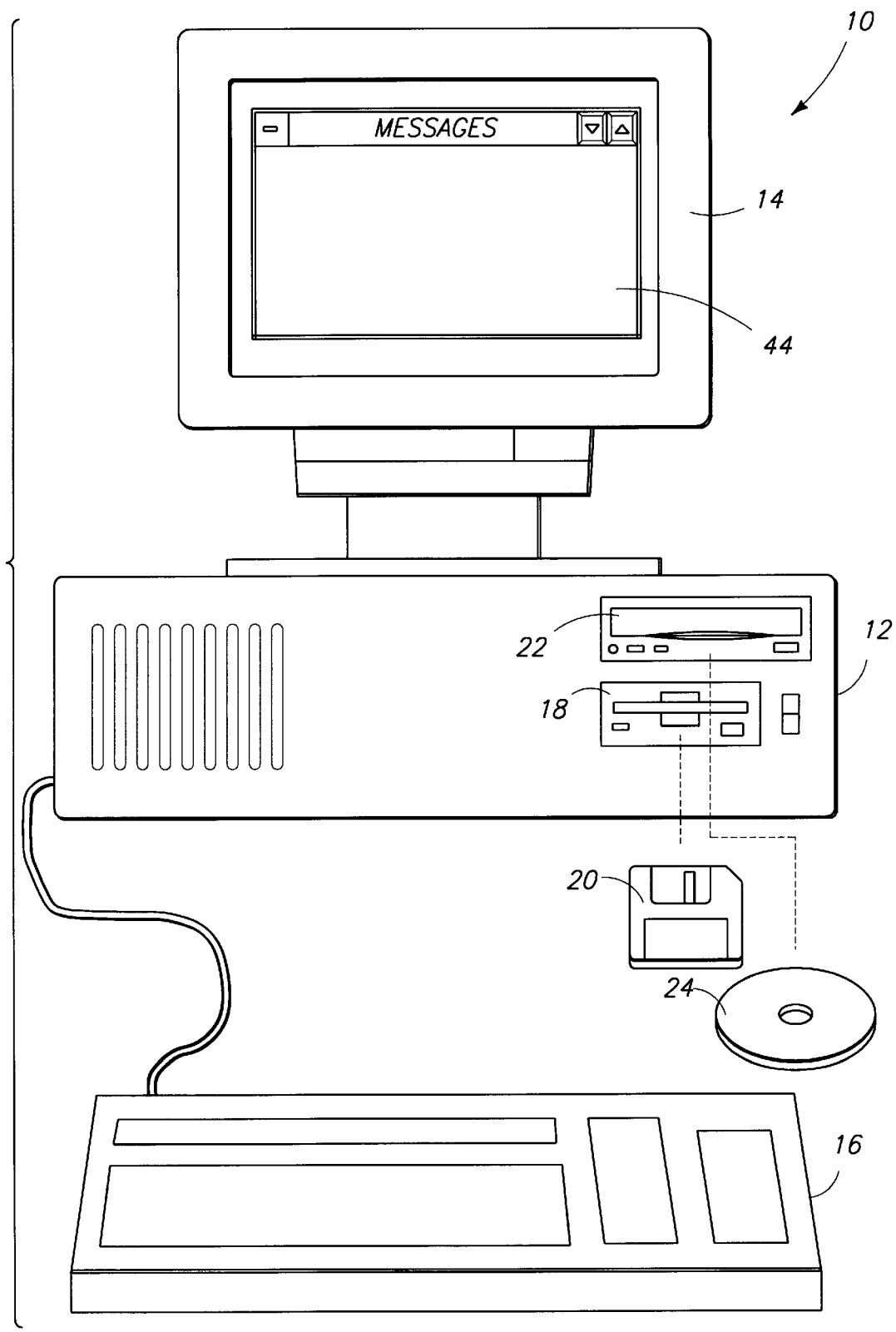
FIG. 1 is a diagrammatic illustration of a computer executing a messaging program according to an example implementation of this invention.

FIG. 1 shows a computer 10 in the form of a conventional desktop IBM-compatible computer. The computer 10 has a central processing unit (CPU) 12, a display monitor 14, and a keyboard 16. The computer 10 also has a floppy disk drive 18 for interfacing with a compatible floppy memory diskette 20 (e.g., 3.5" form factor), and an optical disk drive 22 for interfacing with a compatible CD-ROM 24. The computer 10 might also include another input device in addition to, or in lieu of, the keyboard 16 including such devices as a mouse, track ball, stylus, or the like.

Figure 2:
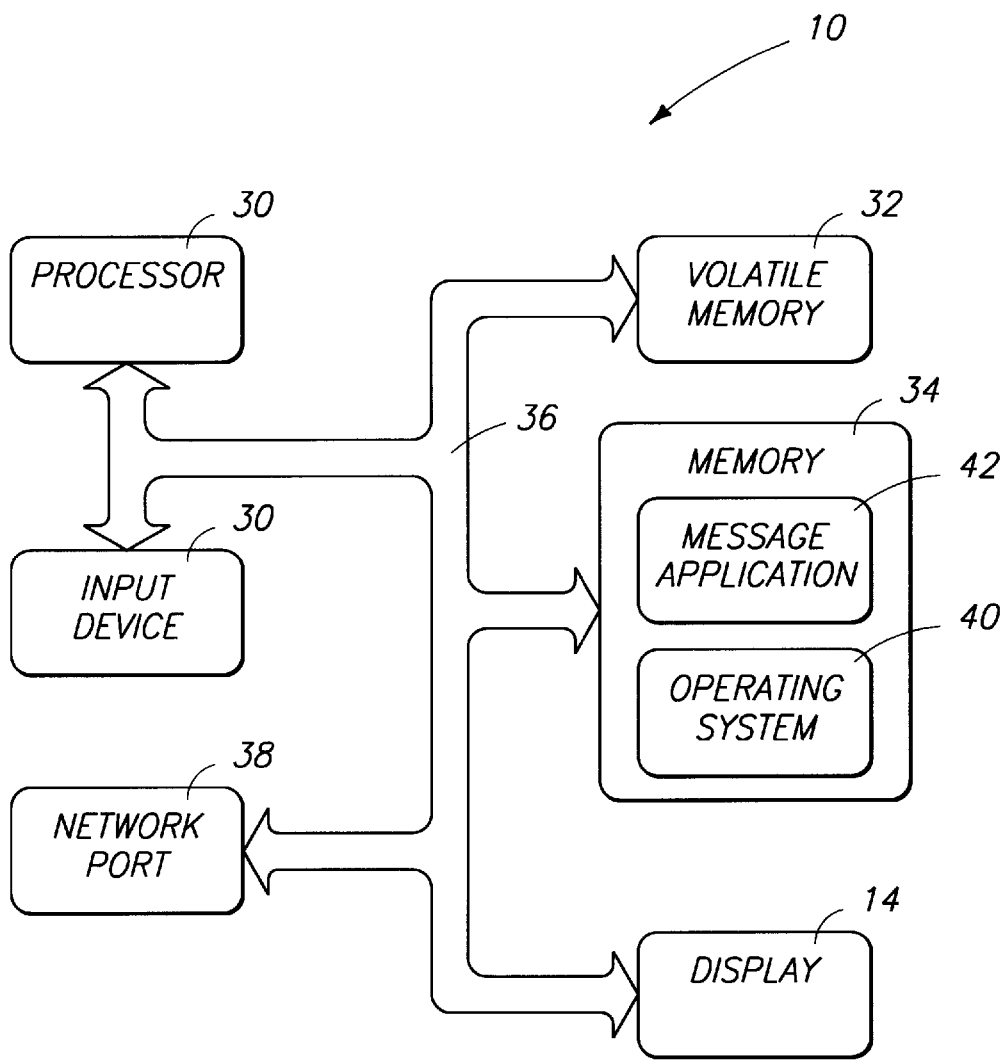
FIG. 2 is a block diagram of the FIG. 1 computer.

FIG. 2 shows a functional block diagram of the computer 10 in more detail. The computer 10 has a processor 30, a volatile memory 32 (e.g., RAM), and a non-volatile memory 34 interconnected by an internal bus 36. The non-volatile memory 34 can be implemented as integrated circuit chips (e.g., ROM, EEPROM), a hard disk drive, or a combination of both. The display 14 is connected to the bus 36 through appropriate hardware interface drivers (not shown). Additionally, the input device 16 is shown connected to supply data to the bus 36 via an appropriate I/O port, such as a serial RS232 port. The computer 10 also includes a network port 38 which facilitates access to a data communications network. This network port 38 can be, for example, a network card for interfacing with a local area network or a modem which enables user-initiated connection to a public network, such as the Internet.

The computer 10 runs an operating system 40 which supports multiple applications. The operating system 40 is stored on the non-volatile memory 34 and executed on processor 30. The operating system is preferably a multitasking operating system which allows simultaneous execution of multiple applications. The operating system preferably employs a graphical user interface windowing environment which presents the applications or documents in specially delineated areas of the display screen called "windows." Each window has its own adjustable boundaries which enable the user to enlarge or shrink the application or document relative to the display screen. Each window can act independently, often including its own menu or other controls (e.g., toolbar), as if it were a virtual display device. One preferred operating system is a Windows® brand operating system sold by Microsoft Corporation, such as Windows 95® or Windows NT® or other derivative versions of Windows®. However, other operating systems which provide windowing environments may be employed, such as the Macintosh Finder from Apple Corporation and OS/2 Presentation Manager from IBM.

A message application 42 is stored in the non-volatile memory 34. When activated, the message application 42 runs on the operating system 40 while executing on the processor 30. The message application 42 organizes messages addressed to the user and presents them in an ordered fashion. Examples of the message application include an electronic mail (e-mail) program, a paging program, and a bulletin board program. As one example, the message application 42 is an e-mail program manufactured and sold under the name Exchange™ by Microsoft Corporation. However, many other types of messaging applications are suitable within the context of this invention. The message application 42 can be loaded into the memory 34 from the floppy diskette 20 or CD-ROM 24, or alternatively, downloaded from a network via the network port 38.

It is noted that the invention is described within the illustrated context of a familiar desktop computer, as shown in FIGS. 1 and 2. An example computer includes a 386-equivalent microprocessor, or better, with four to eight megabytes of RAM. This example computer is capable of running a multitasking operating system with a windowing environment. However, aspects of this invention might also be employed in other forms of computing devices, such as laptop computers, hand held computers, portable personal information managers (PIMs), pagers, and the like. In these devices, the network port 38 might represent a receiver capable of receiving messages from an external source using wireless technology. Examples include an IR (infrared) receiver which receives messages using infrared technology, or an RF receiver which receives messages transmitted using RF (radio frequency) technology.

With reference again to FIG. 1, the user launches the message application in a customary fashion by, for example, clicking on an icon or choosing the program from a menu. The user interface of the message application is displayed on the monitor 14 and bounded within a window 44, as is customary in a graphical user interface windowing environment. The window 44 is associated with the messaging application, and is referred to as the "message window."

Figure 3:
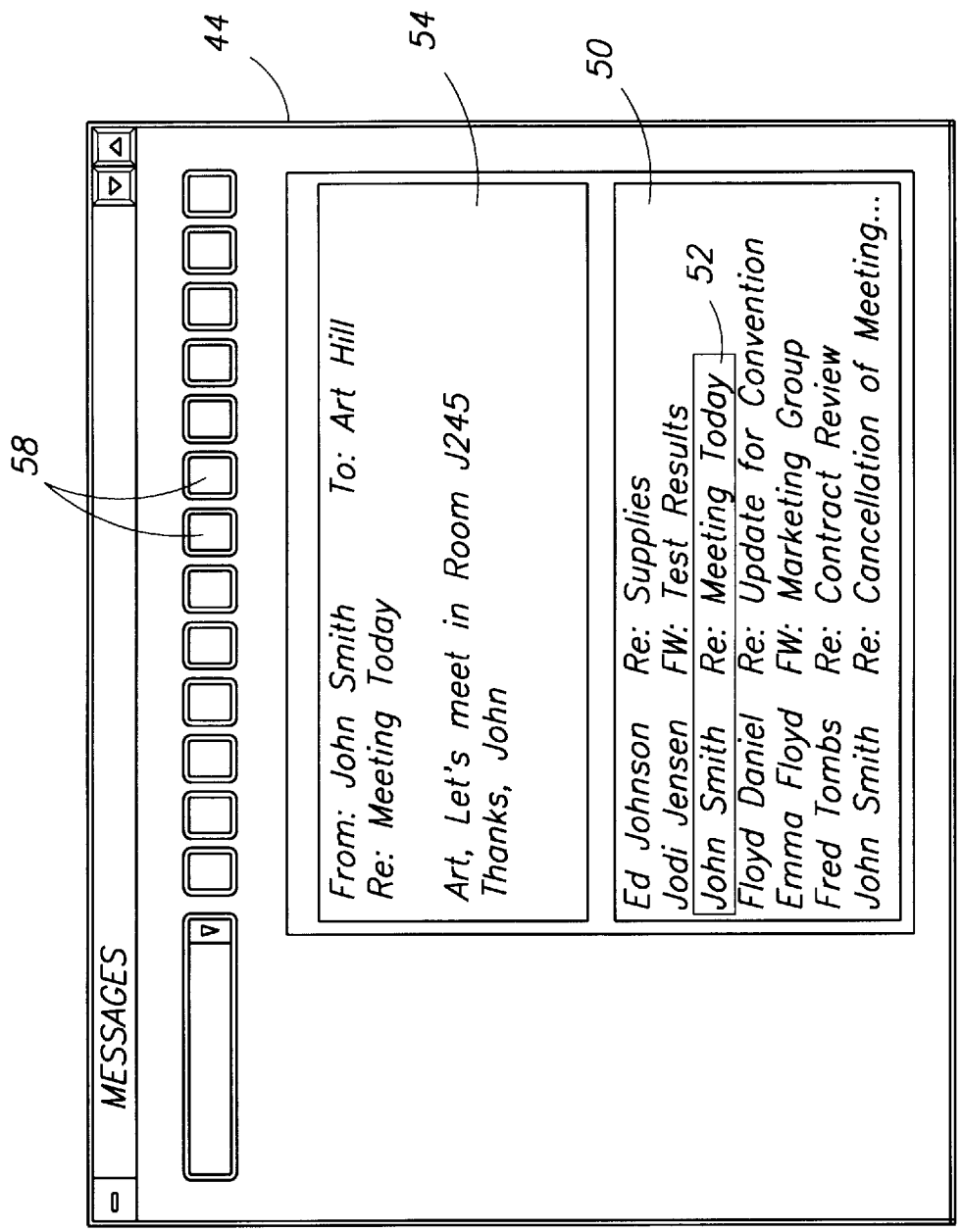
FIG. 3 is a diagrammatic illustration of a graphical message window with a preview pane.

FIG. 3 shows the message window 44 in more detail. The message window 44 includes a list pane 50 which comprises a list of messages addressed to the user. The list includes the sender's name, the subject of the message, and the time received. Space permitting, other information can also be included in the list, including urgency level or security level of the message. The list organizes the message headers in chronological order according to the time they are received. As illustrated, the messages are listed oldest to newest in a top-down order with newest message at the bottom of the list. However, this order can be reversed so that the newest message is on top of the list.

The list pane 50 shows both those messages that have been read by the user, and those messages which have not been read. In the FIG. 3 illustration, the read messages are shown in plain text while the unread messages are shown in boldface text. A highlight bar 52 identifies a selected message on the list. The user manipulates the highlight bar 52 by using a mouse or keyboard to scroll through the list of messages.

The message window 44 also includes a preview pane 54 adjoining the list pane 50. The preview pane 50 displays the contents of the message being highlighted by the highlight bar 52 in list pane 50. The preview pane 54 provides a quick glance at the highlighted message without requiring the user to open the message into a separate window. The preview pane is implicitly linked to the highlighted message in the list pane 50 so that the message content is instantly shown in the preview pane 54 upon highlighting the corresponding message header in the list pane 50. In this example, a message from John Smith is highlighted in list pane 50 and the contents are displayed in preview pane 54. This message is rather short and fits entirely within the preview pane. Other messages, however, might be considerably longer and may not fit entirely within the preview pane 54.

Icon buttons 58 are arranged within the message window 44 to enable certain functions. The icon buttons might allow the user to store the message, reply to it, forward it, print it, and so on. These icon buttons are configurable according to the messaging application.

Figure 4:
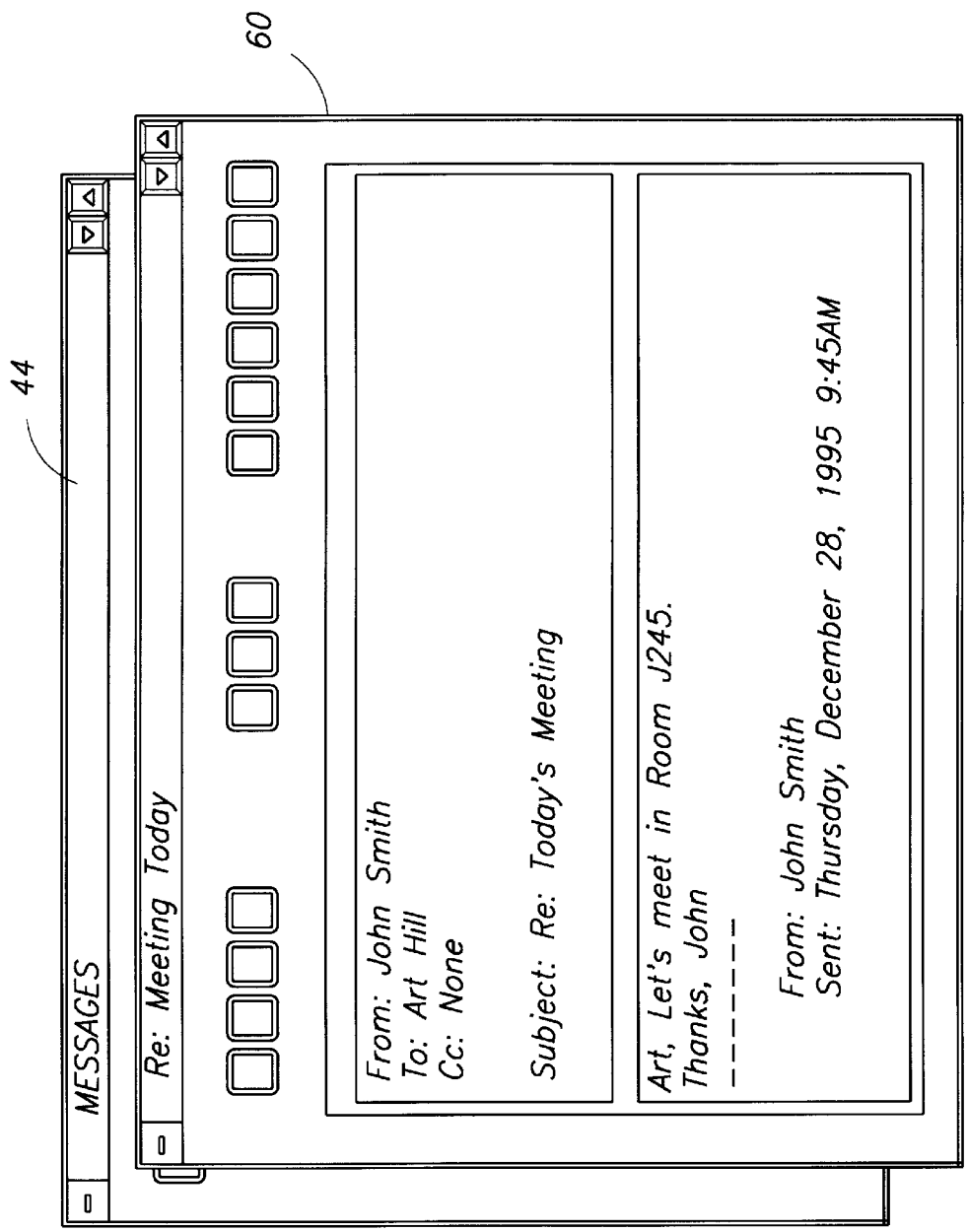
FIG. 4 is a diagrammatic illustration of a separate graphical window showing contents of a message overlaid on the FIG. 3 message window.

If the user desires to open a particular message, the user can activate the message in conventional fashion by directing the mouse pointer on the message and clicking, or by using the cursor keys to position the highlight bar and depressing the enter key. FIG. 4 shows a separate window 60 for the opened message. This message-specific window 60 is overlaid in a tile arrangement on the original message window 44. The opened message window 60 shows the message contents and provides more particular data relating to how and when the message was sent.

The message application 42 marks messages in the list pane 50 as being read when it is likely that the user has indeed read them. To mark messages as read, the boldface text (indicative of an unread message) is converted to a plain non-bolded text (indicative of a read message). The determination to mark a message as read is based upon one or more heuristics which are constructed to indicate when it is likely that the user has read or left unread a message in the list pane 50.

FIG. 5 shows a method for distinguishing between read and unread messages. This method is described with continuing reference to FIGS. 1–4. At step 70, the processor executing the message application displays the highlighted message in the preview pane 54. The processor then sets a mark_as_read flag to FALSE (step 72) and sets a timer for a selected time-out period (step 74). Next, the computer monitors for activity evidencing user interest in the previewed message.

An explicit action that causes the message to be marked as read occurs when the user explicitly opens the message (step 76). If the message is opened (i.e., the "yes" branch from step 76), the user is assumed to be reading the message and the mark_as_read flag is set to TRUE (step 78); otherwise, the flag remains FALSE.

Other than this explicit action, there are other implicit heuristics which the computer monitors. Any one of these implicit heuristic conditions might be sufficient to conclude that the user has in fact read the highlighted message. One implicit heuristic is whether the user has scrolled the message while it is displayed in the preview pane (step 80). Scrolling evidences that the user has purposefully sought to view more of the message within the preview pane, thereby indicating that the user has read the message. If scrolling occurs, the mark_as_read flag is set to TRUE (step 78); otherwise, the flag remains FALSE.

Another implicit heuristic is whether the user has had sufficient opportunity to read the message in the preview pane before highlighting another message or closing the message application. This implicit heuristic is accomplished by a two part test at steps 82 and 84. Essentially, the user is presumed to have read the highlighted message if the entire message fits within the preview pane (i.e., the "yes" branch from step 82) and the entire message remains visible for the selected time-out period (i.e., the "yes" branch from step 84). If both tests are met, the mark_as_read flag is set to TRUE (step 78); otherwise, the flag remains FALSE.

The user is permitted to expressly override the automatic heuristic evaluation. For instance, if the user at any time explicitly marks the message as unread (i.e., the "yes" branch from step 86), the mark_as_read flag is set to FALSE (step 88). In this situation, any pending time in the time-out period is canceled and the scrolling heuristic is ignored.

When the user leaves the current highlighted message, either by moving the highlight bar on to another message or by quitting the message application altogether, the message is marked as read in the event that the mark_as_read flag is set to TRUE (step 92). Otherwise, the message remains marked as unread.

The order of the heuristic conditions in the FIG. 5 flow diagram is provided for discussion purposes. These conditions can be rearranged. Additionally, although the flow diagram implies a sequential evaluation of each heuristic condition, each condition is more likely to be monitored in parallel, whereby a satisfied condition is an interrupt to the processor to set or reset the mark_as_read flag.

The method has several advantages. One advantage is that the mark-as-read rules more closely resemble the actual behavior of the user by marking only those messages that the user is likely to have read. Another advantage is that the user does not need to explicitly open the message into a separate window in order to mark the message as read.

Another advantage is that the user can scroll through the list of messages in the list pane 50 to any desired unread message without necessarily causing all unread messages listed above the selected message to be marked as read. For example, with reference to FIG. 3, suppose the user wants to skip to the last message shown. This message, like the presently highlighted message, is from John Smith and both messages concern a possible meeting today. However, the latter message header suggests that the meeting might be canceled and the user might save time by simply going to that newer message without reviewing the older, but unread messages. Scrolling through the message headers in the list pane 50 does not satisfy any of the heuristics, and hence none of the unread messages are marked as read. This is appropriate since the user truly has not read them, even though they might have appeared briefly in the preview pane 54 as the user scrolled past the corresponding message header. Accordingly, this method is beneficial over prior art schemes.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. A method for distinguishing messages to be read by a user from messages that have been read by the user, the messages being listed in a graphical message window, the message window having a preview pane which enables the user to view content of at least one listed message without opening the message into a separate graphical window, the method comprising the following steps:

displaying an unread message in the preview pane;

detecting whether the message is scrolled within the preview pane to determine whether the user is likely to be reading the message while the message is displayed in the preview pane without having opened the message in to the separate graphical window; and marking the message as read if the message is scrolled within the preview pane.

2. A method as recited in claim 1, further comprising the step of marking the message as unread, regardless of satisfying the heuristic condition, in an event that the user expressly requests that the message be marked as unread.

3. A computer-readable memory which directs a computer to perform the steps in the method as recited in claim 1.

4. A computer programmed to perform the steps in the method as recited in claim 1.

5. A method for distinguishing messages to be read by a user from messages that have been read by the user, the messages being listed in a graphical message window, the message window having a preview pane which enables the user to view content of at least one listed message without opening the message into a separate graphical window, the method comprising the following steps:

displaying an unread message in the preview pane; and marking the message as read in an event that the user scrolls the message in the preview pane.

6. A method as recited in claim 5, further comprising the step of marking the message as unread, regardless of whether the user scrolls the message in the preview pane, in an event that the user expressly requests that the message be marked as unread.

7. A method as recited in claim 5, further comprising the step of marking the message as read in an event that the user opens the message into the separate graphical window.

8. A computer-readable memory which directs a computer to perform the steps in the method as recited in claim 5.

9. A computer programmed to perform the steps in the method as recited in claim 5.

10. In a graphical message window for displaying a list of messages addressed to a user in which each message can be viewed in a preview pane of the graphical message window without opening the message into a separate graphical window, a method for distinguishing messages to be read by the user from messages that have been read by the user comprises the step of marking the message as read if the user scrolls the message in the preview pane.

11. A computer-readable memory which directs a computer to perform the step in the method as recited in claim 10.

12. A computer programmed to perform the step in the method as recited in claim 10.

13. A computing apparatus comprising:

a processor;

a display;

an operating system executing on the processor which provides a multitasking graphical user interface environment capable of presenting one or more graphical windows on the display;

a messaging application running on the operating system to list messages within a message window of the graphical user interface, the graphical message window having a preview pane in which at least one listed message can be previewed by a user without opening the message into a separate graphical window; and the messaging application utilizing a heuristic condition to determine whether the user is likely to be reading the message while the message is displayed in the preview pane without having opened the message in to the separate graphical window and marking the message as read if the heuristic condition is satisfied, wherein the heuristic condition comprises scrolling the message in the preview pane.

* * * * *